US006493990B1

(12) United States Patent
Anderson

(10) Patent No.: US 6,493,990 B1
(45) Date of Patent: Dec. 17, 2002

(54) PROCESS AND RELATED APPARATUS FOR REPAIRING AQUATIC PROPELLER SCARS

(76) Inventor: James F Anderson, 3941 24th St. SE., Ruskin, FL (US) 33570

( * ) Notice: Subject to any disclaimer, the term of this patent is extended or adjusted under 35 U.S.C. 154(b) by 0 days.

(21) Appl. No.: 09/858,744

(22) Filed: May 16, 2001

Related U.S. Application Data

(63) Continuation-in-part of application No. 09/573,724, filed on May 18, 2000.
(51) Int. Cl.[7] ............................................... A01G 23/02
(52) U.S. Cl. ............................ 47/73; 47/65.8; 47/65.7; 47/74; 47/58.1; 47/111; 47/100
(58) Field of Search .......................... 47/59, 65.8, 65.7, 47/33, 63, 64, 74; 504/150; 405/19, 24; 111/100

(56) References Cited

PUBLICATIONS

Florida Marine Research Institute Technical Reports FMRI Technical Report TR–1 1995.

Primary Examiner—Peter M. Poon
Assistant Examiner—Andrea M. Valenti
(74) Attorney, Agent, or Firm—Donald R Bahr

(57) ABSTRACT

A process and apparatus for planting aquatic plants underwater on the bottom of estuaries in propeller scars and for encouraging plant growth in propeller scars. Aquatic plant shoots are transplanted by positioning shoots in a sediment tube which is in turn placed in the propeller scar. When the sediment tube is placed in the propeller scar the sea grass shoots are held in position for an extended period of time to allow the sea grass shoots to take root on the estuary bottom. The sediment tubes may be preformed or they may be formed just prior to their placement in the estuary. A watercraft may be used to position the sediment tubes with and without sea grass shoots over an area of the propeller scar. With the process and apparatus of this invention, sea grass plants can be replanted on the bottom of an estuary and new plant growth encouraged in propeller scars. Further in accordance with another embodiment of this invention a tube or other obstruction without plant shoots is placed in a propeller scar in order to impede water flow through the propeller scar. When water flow through the propeller scar is impeded natural plant growth is encouraged.

18 Claims, 7 Drawing Sheets

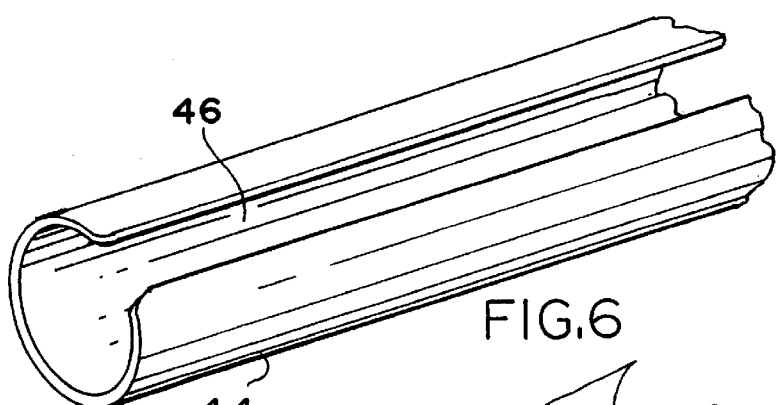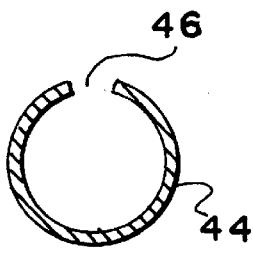
FIG. 6
FIG. 6a
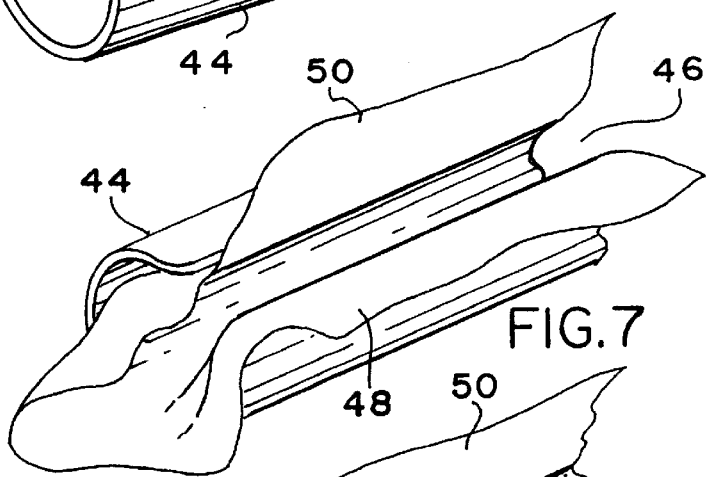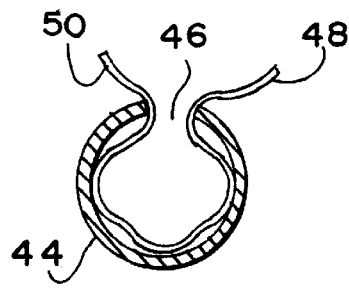
FIG. 7
FIG. 7a
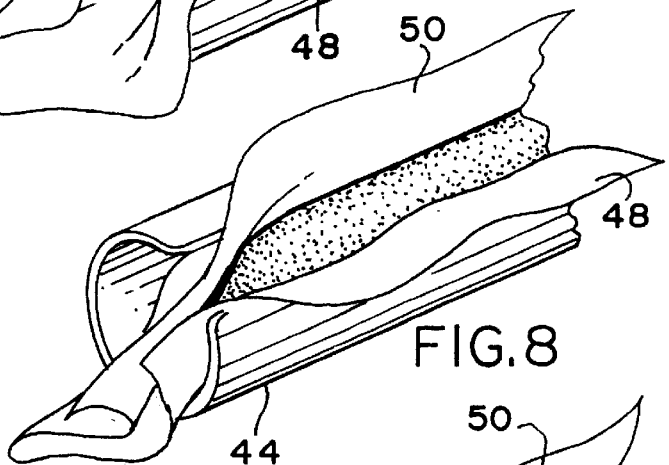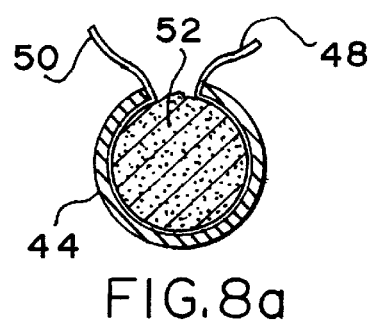
FIG. 8
FIG. 8a
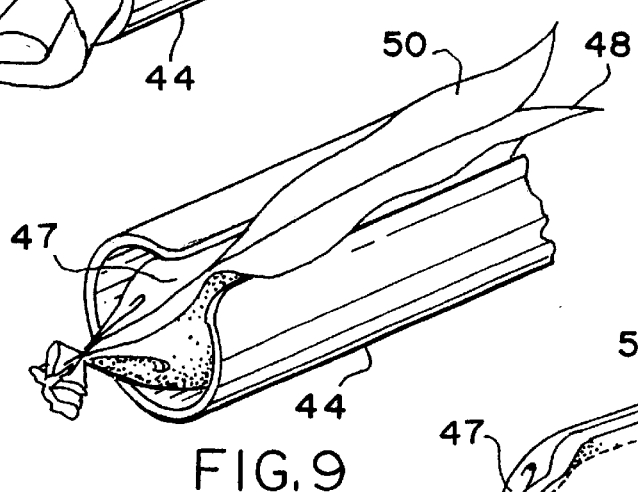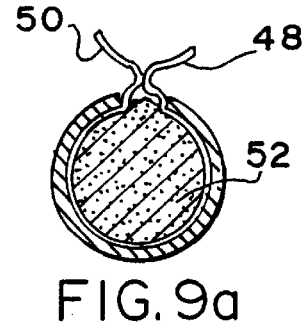
FIG. 9
FIG. 9a
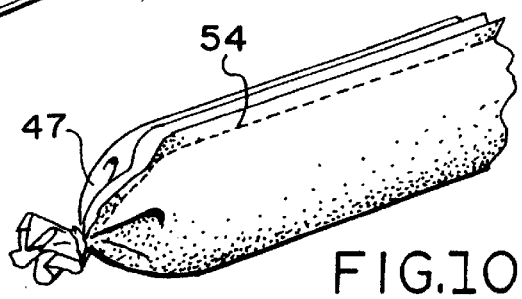
FIG. 10

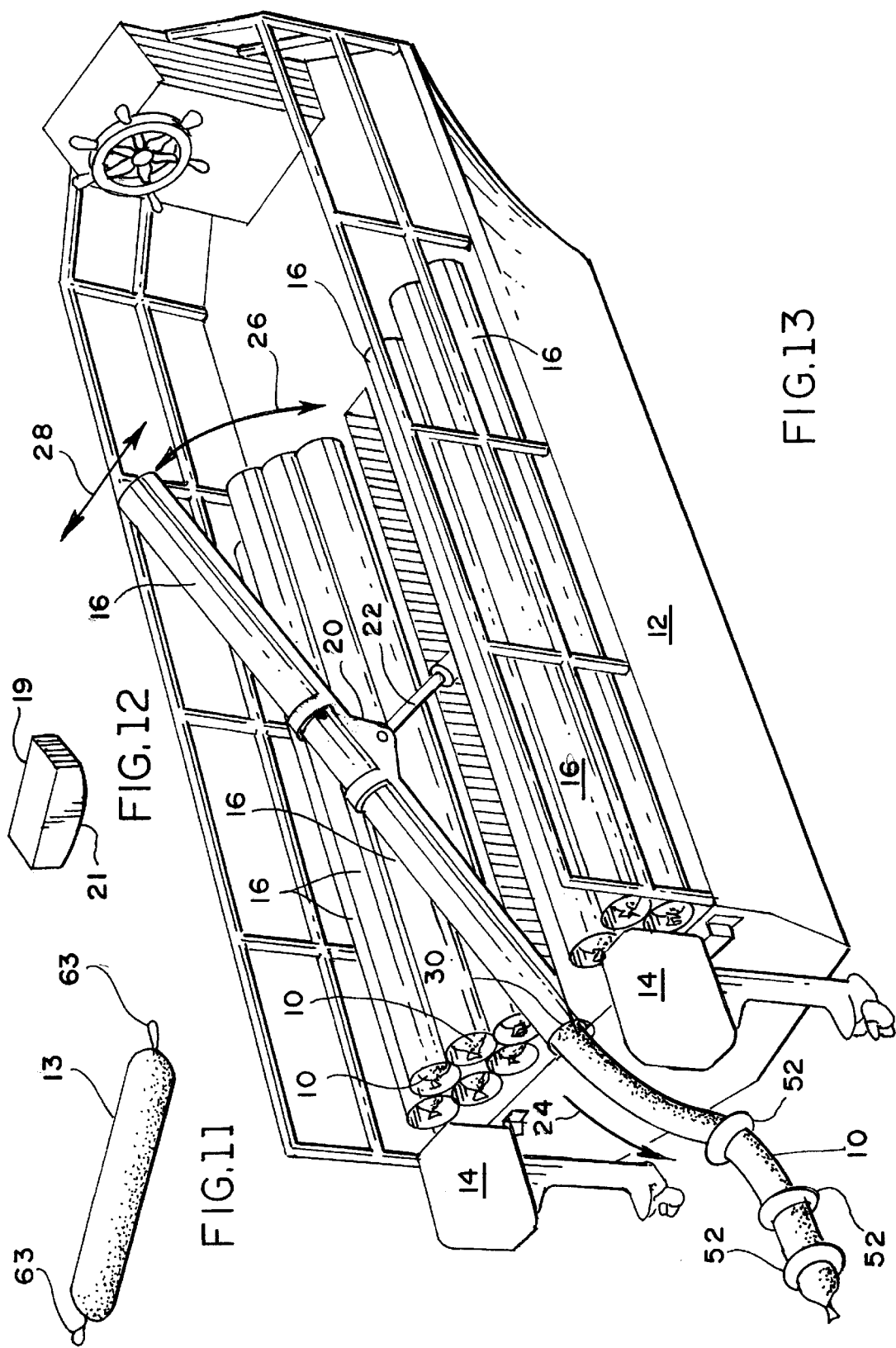

PROCESS AND RELATED APPARATUS FOR REPAIRING AQUATIC PROPELLER SCARS

RELATED APPLICATIONS

This application is a continuation-in-part application of application Ser. No. 09/573,724 filed May 18, 2000.

BACKGROUND OF THE INVENTION

This invention is concerned with a process and related apparatus whereby aquatic propeller scars may be repaired underwater for purposes of restoration. The restoration of all aspects of the environment has become extremely important in recent years. The three areas of restoration which are of primary import are reducing air pollution, restoring and cleaning up the land and cleaning up and restoring our waterways, the ocean and related estuaries. It is these related estuaries that are the primary thrust of the subject invention.

As a result of the decrease in water quality, millions of acres of aquatic plant life, which form an important part of the aquatic Eco system, have been destroyed. While the restoration of aquatic plant life is difficult, it is possible, for example see the process and apparatus of co pending application Ser. No. 09/104,681 filed Jun. 25, 1998 now U.S. Pat. No. 6,070,537 and application Ser. No. 09/573,724 filed May 18, 2000. While the process of this U.S. Pat. No. 6,070,537 is well suited to the planting of large underwater areas it is not particularly suited to the replanting of propeller scars. Propeller scars are areas that have been striped of aquatic plant life, as a result of the propeller of the moving boat inadvertently being allowed to come into contact with the estuary bottom, thereby leaving a semicircular trench on the bottom of estuary.

Because aquatic plant life is an important part of the complex aquatic environment, the restoration of the total estuary bottom is important including propeller scars.

The natural restoration of aquatic life, in propeller scars is an extremely slow process. While it is possible to manually plant shoots of aquatic plants, in propeller scars this process is extremely slow and expensive. Due to the cost of labor, the manual planting of sea grass plants has at best been marginally successful. Further due to the peculiar nature of propeller scars manual planting is often unsuccessful. Also because propeller scars are widely dispersed the cost of manually planting just one propeller scar in an estuary can be prohibitive. Likewise manual planting in some instances is of questionable success as the person doing the planting, in walking over the bottom of an estuary, does further damage by crushing other plants which may be growing in the area.

This invention is concerned with a process and apparatus whereby sea grass can be restored and quickly planted in an economical fashion in a propeller scar or the propeller scar can be filled in such a manner that the re-colonization of sea grass is encouraged.

As used in connection with this invention, the term aquatic plant life and sea grass includes many species of plant life such as halodule wrightii (shoal grass), thalassia (turtle grass), etc. The process and apparatus of this invention is particularly suited to the planting of thalossia sea grass in propeller scars and the re-colonization of sea grass in these propeller scars.

Aquatic plant life as it exists in estuaries is important in preventing water pollution as this plant life acts as a filter for many pollutants and hence, this plant life helps to maintain water quality. Therefore it is important that the maximum area be covered with aquatic plants including those areas that have been denuded of plant life by the contact of a marine propeller with the estuary bottom.

The restoration of aquatic life to the bottom of our estuaries is extremely important as this aquatic plant life plays a critical function in the total marine Eco system. A large number of important marine animals, both warm and cold blooded, rely totally or in part on aquatic plants as a breeding area, for cover, for food, etc. For example, the endangered manatee relies solely on sea grass as its food source and sea turtles rely on sea grass for part of their diet.

OBJECT OF THE INVENTION

The primary object of this invention is a process whereby aquatic plant life may be and planted or restored in propeller scars which are located in the bottom of an estuary.

A further object of this invention is a process whereby a propeller scar can be filled in such a manner as to encourage the re-growth of sea grass.

DESCRIPTION OF THE DRAWINGS

FIGS. 6 and 6a are perspective and end view showing a tube which is particularly suitable for forming a sediment tube for use in this invention.

FIGS. 7 and 7a are perspective and end view showing the initial steps in the forming of a sediment tube for use in this invention.

FIGS. 8 and 8a are perspective and end views showing sand being placed in the tube for use in this invention.

FIGS. 9 and 9a are perspective and end views showing the final closure of the tube for use in this invention.

FIG. 10 is a perspective view showing the sediment tube as produced in accordance with FIGS. 6 to 9a.

FIG. 11 is a perspective view showing an alternate embodiment of a sediment tube for use in this invention.

FIG. 12 is a perspective view showing a brick which may be used to impede the flow of water through a propeller scar in accordance with this invention.

FIG. 13 is a perspective view showing a method for positioning a sediment tube over a propeller scar.

DESCRIPTION OF THE PREFERRED EMBODIMENTS

The subject invention relates to a process and apparatus for planting aquatic plants, and for encouraging aquatic plant growth in scars such as propeller scars.

Referring to FIGS. 1, 1a, 1b, 2 and 3, a broad perspective of this invention can be seen.

Figures 1, 2, 3:
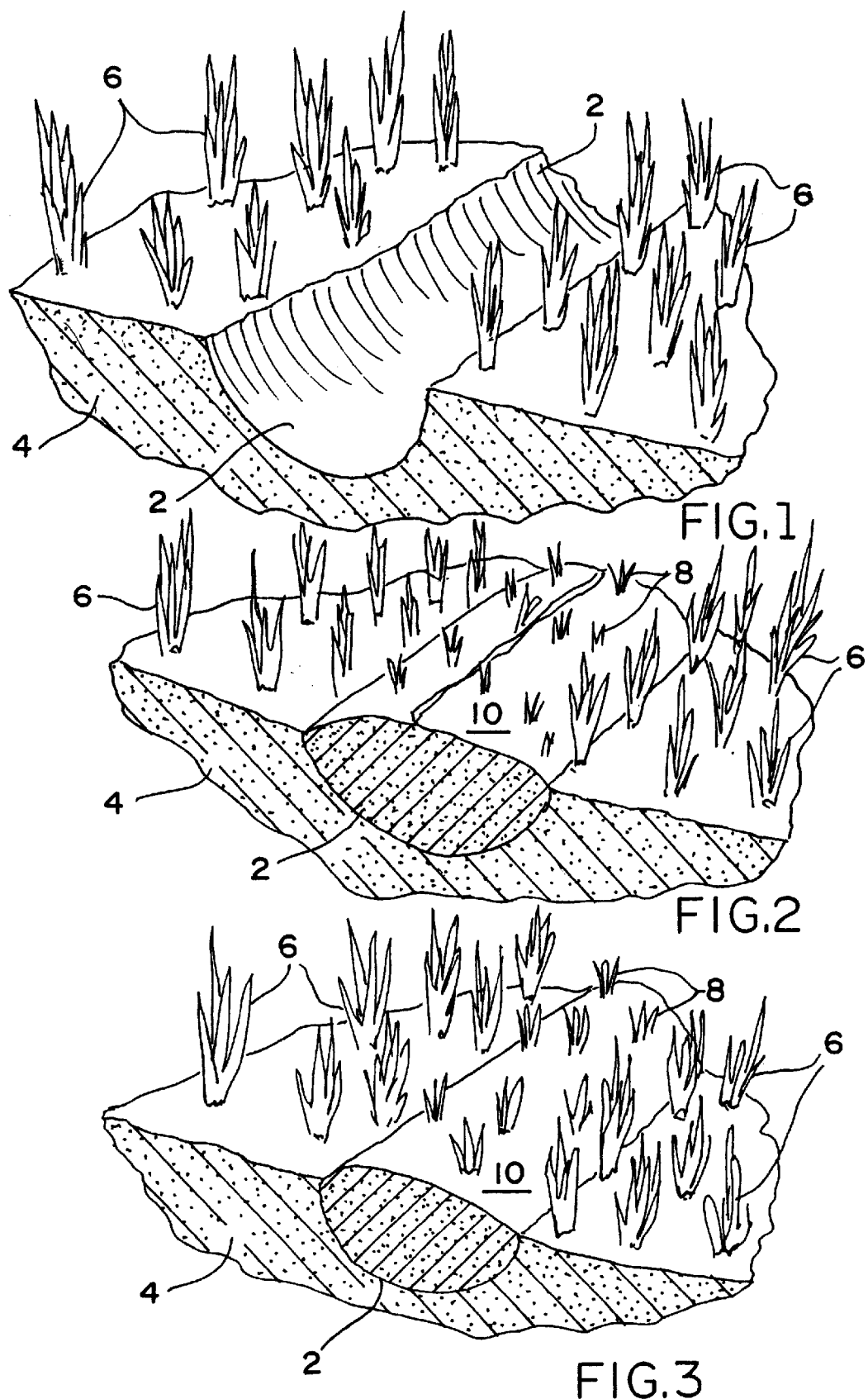
FIG. 1 is a sectioned perspective view showing a propeller scar.
FIG. 2 is a sectioned perspective view showing the placement of the sediment tube of this invention in an underwater propeller scar.
FIG. 3 is a sectioned view of the continued placement of the sediment tube of this invention in the propeller scar and the restoration of aquatic plants in this scar.

FIG. 1 shows the anatomy of a scar in the illustrated instance a propeller scar 2. Propeller scar 2 is essentially a furrow that has been plowed into the bottom 4 of an estuary by the action of a rotating propeller. As can be seen estuary bottom 4 incorporates existing sea grass 6 which is naturally occurring. Further it can be seen that propeller scar 2 has been denuded of sea grass by the rotation of the propeller.

In most instances propeller scars are the result of the inadvertent action of a boater. As is discussed above sea grass is an important part of the Eco system. In addition sea grass is beneficial in that it provides refuge and cover for small fish and other aquatic life, which in turn attracts larger fish. The presence of these larger fish is the start of the propeller scar problem as these large fish attract sport and commercial fisherman. These fisherman either as a result of their carelessness or enthusiasm sometimes let their boats enter water which is too shallow for the boat in question. Further this positioning of the boat in water which is too shallow often results from changing water levels i.e. a falling tide.

When a boat is in water which is too shallow the propeller often comes into contact with the estuary bottom. When estuary bottom 4 is sandy it is possible for a boat to move forward even if the propeller is in contact with estuary bottom 4. Regretfully this careless action of the boater causes the propeller to plow the estuary bottom 4 such that a propeller scar 2 is formed.

The subject invention has two embodiments, the first embodiment relates to the placement of a sediment tube into the propeller scar in order to facilitate the reintroduction of sea grass into the propeller scar. The sediment tube in this instance incorporates shoots of an appropriate aquatic plant.

The second embodiment relates to the interpretation of the natural flow of water in a propeller scar in such a manner that native aquatic plants can root in the propeller scar.

As to the first embodiment of this invention referring to FIG. 2, it can be seen that sediment tube 10 is placed in propeller scar 2. Sediment tube 10 is an elongated structure which is filled with sand or other material which is conducive to plant growth. When positioned in propeller scar 2 sediment tube 10, incorporates a plurality of sea grass plant shoots 8, which over an extended period of time grow and take root in estuary bottom 4.

FIG. 3 illustrates the planting process of this invention when the restoration of growing sea grass 8 to propeller scar 2 is essentially complete. From this figure it can be seen that propeller scar 2 has essentially been filled in and sea grass plant shoots 8 have rooted and started to grow. Sediment tube 10 is formed from a biodegradable material. At the start of the planting process illustrated in FIG. 3 the degeneration of sediment tube 10 has started. Sediment tube 10 can be formed from a variety of materials such as natural and synthetic textiles, degradable polymers and biodegradable polymers, which contain materials such as starch, to aid in there biodegradation. Polymeric films which are formulated without ultraviolet inhibitors or limited amounts of ultraviolet inhibitors are also preferred as these films readily degrade as a result of exposure to sunlight. The most preferred material for use in the manufacture of sediment tube 10 is cotton fabric. Cotton being a natural fiber is completely compatible with estuary bottom environment. Further cotton is easy to work with, to sew and it is inexpensive. It has been found that sediment tubes which are formed from cotton essentially degrade in four to six months which is the proper time for sea grass shoots 8 to grow, take root and penetrate sediment tube 10 through to estuary bottom 4 or for runners 7 from naturally occurring sea grass 6 to take root. Other natural fibers which can be used are coconut fibers, hemp and burlap. Further mixtures of the above mentioned fibers and materials can be used to form the sediment tubes as are used in this invention.

Figure 4:
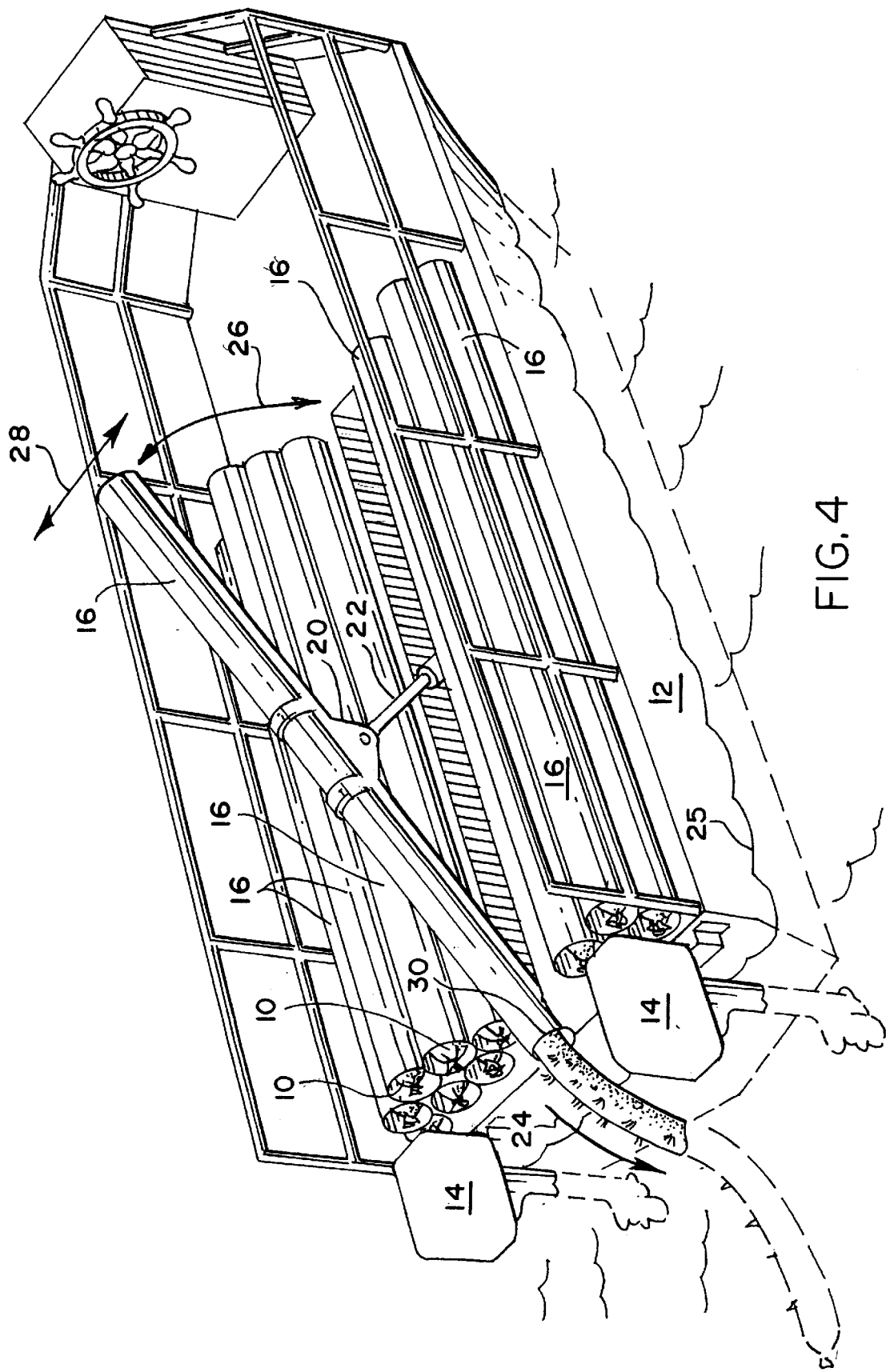
FIG. 4 is a perspective view of the discharge of a sediment tube of this invention into an estuary.

FIG. 4 shows apparatus in accordance with this invention whereby preformed sediment tubes 10 and 11 may be positioned in a propeller scar. In this embodiment a boat 12 is provided, this boat being propelled by one or more outboard engines 14. A plurality of sediment tubes 10 and 11 are formed, preferably onshore. These sediment tubes are filed with a growing medium and may have a plurality of sea grass shoots 8 planted therein. These preformed sediment tubes 10 and 11 are then positioned in tubular support 16 which in their simplest forms are 10 to 20 foot sections of PVC pipe. In operation a tubular member 6 is loaded into a support 20 which may be elevated by a hydraulic motor 22. Upon the elevation of support 20, in accordance with arrow 26, the preformed tube slides out of tubular member 16 and slips below water surface 25 and into a propeller scar, not shown. The slippage of tubes 10 or 11 out of tubular support 16 is in accordance with arrow 24. Support 20 is further pivotally mounted to hydraulic motor 22 such that horizontal rotation in the direction of arrow 28 is possible. With this a rotational capability an operator in the rear of boat 12 is able to move end 30 of tubular member 16 in such a manner that tubes 10 or 11 may be easily guided into the propeller scar.

Figure 5:
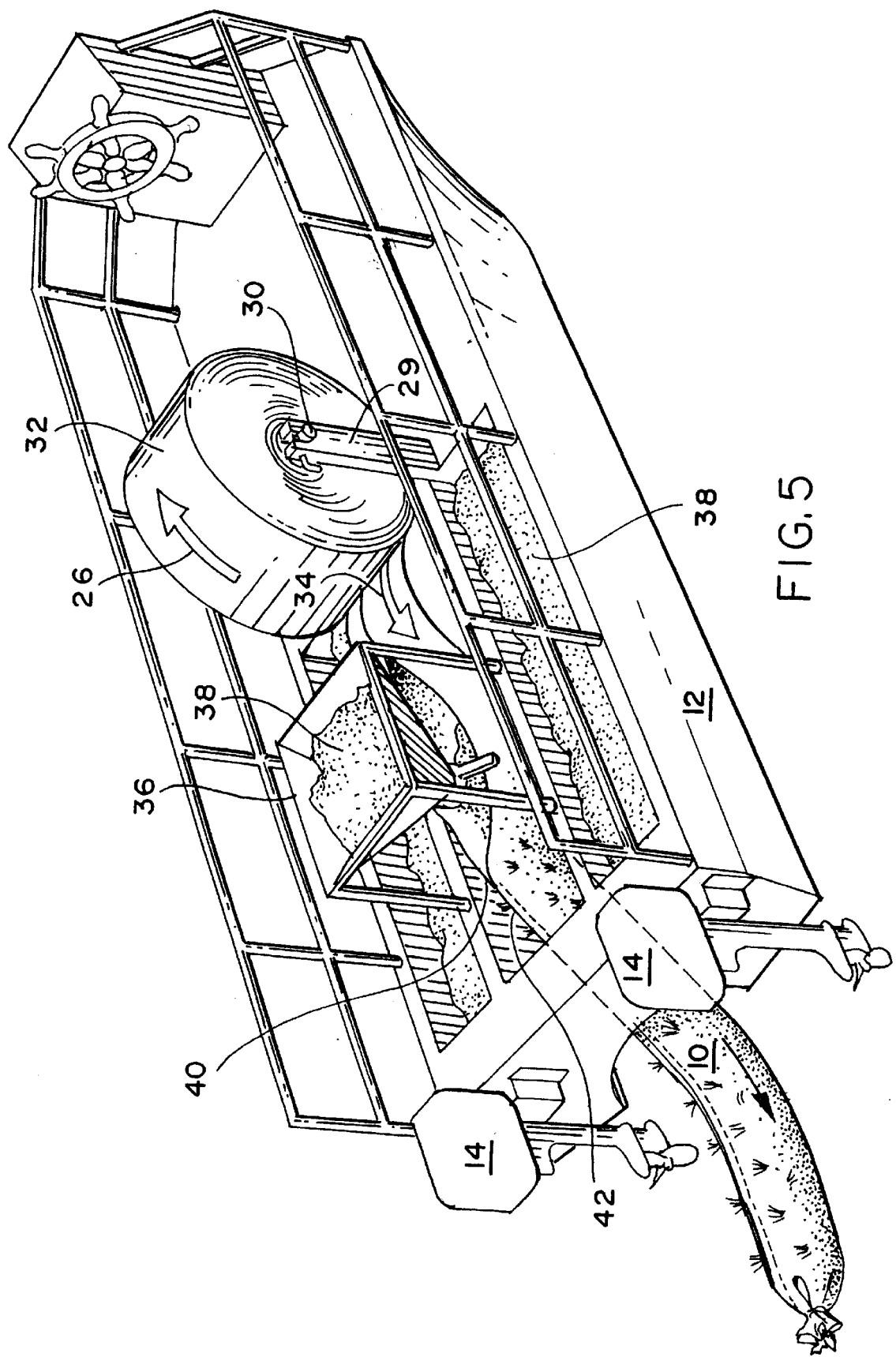
FIG. 5 is a perspective view showing the formation of a sediment tube and it's discharge into an estuary.

FIG. 5 illustrates still another embodiment of this invention, wherein the deck of boat 12 is further supplied with a roll 26 of textile or film material which is supported on stand 29 via rollers 30. Upon the rotation of roll 26 in the direction of arrow 32 a section of material 34 is played off of roll 26. Sheet material 34 is then partially closed and granular material (sand) 38 is fed out of hopper 36 and into the partially closed section of sheet material 34. The closure of sheet material 34 is then completed and the closure is secured with an adhesive or by, stapling or heat sealing in a conventional manner. This closure is effected by means 40.

Plant shoots 8 are then placed in the preformed sediment tube 10 at station 42 this placement may be either manual or automated.

Referring back to FIG. 1 it has been found that because of the semicircular nature of propeller scar 2 if water flow through the propeller scar is impeded organic debris will accumulate in the bottom of propeller scar 2. This ongoing accumulation of debris is conducive to the colonization of sea grass in propeller scar 2. In order to assist in the re-colonization of seagrass it is preferred that sediment tube 10 be filled with pure sand and preferably sand which incorporates fertilizer. It is preferred that the sand incorporate about 10% percent fertilizer. While the preferred fertilizer is granular as an alternate means of fertilizing the propeller scar 2 liquid fertilizer may be injected into the area on either side of the propeller scar after sediment tube 10 is placed in said propeller scar. The fertilizer may be of the granular time release variety wherein the time release of the fertilizer is timed for the optimum encouragement of plant growth.

The above discussion and drawings show the placement of a plurality of plant shoots 8 in sediment tube 10. In the second embodiment of this invention plant shoots 8 may be omitted from sediment tube 10. In this embodiment tube 11 without plant shoots 8 is placed in propeller scar 2 in order to stabilize and fill propeller scar 2. Once this propeller scar is filled and stabilized natural re-colonization of sea grass will occur from either side of the propeller scar.

Figure 1A:
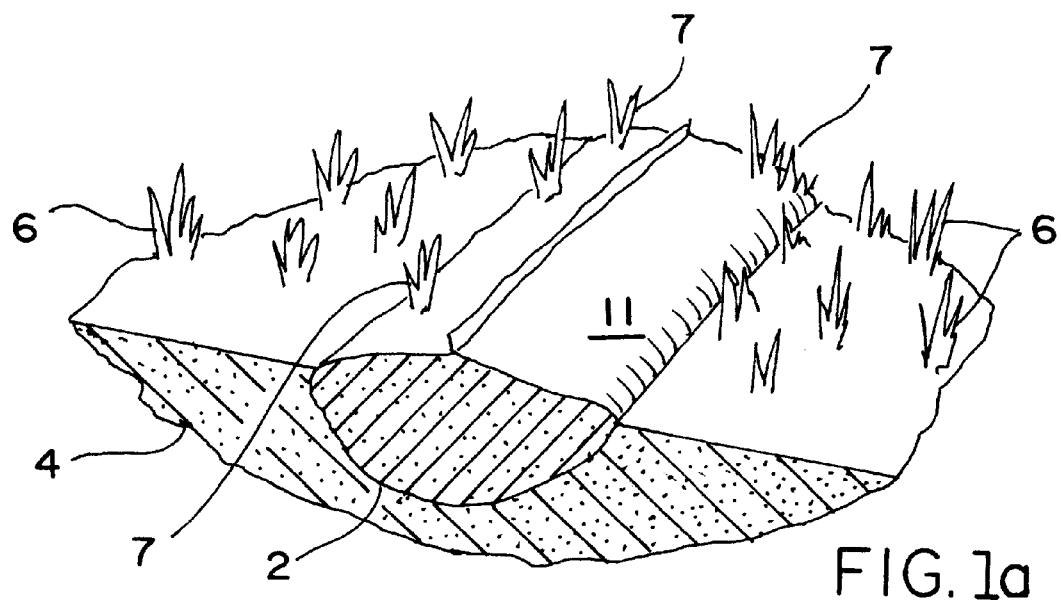
FIG. 1a is a sectioned perspective view showing a propeller scar with a sediment tube therein.

As to this second embodiment of this invention, it can be seen from FIG. 1 and 1*a* propeller scar 2 is essentially a trough through which water can flow unimpeded. With water flow i.e. tidal currents, water is moving back and forth on a constant basis, through propeller scar 2. As a result of this constant water movement existing native grass 6 cannot spread into propeller scar 2. That is as native grass puts out runners into propeller scar 2 the rooting of these runners is constantly being disrupted by the constant water flow through propeller scar 2. In accordance with the second embodiment of this invention water flow through propeller scar 2 is impeded in such a manner that sediment builds up and the runners from native grass 6 can root in propeller scar 2.

Figure 1B:
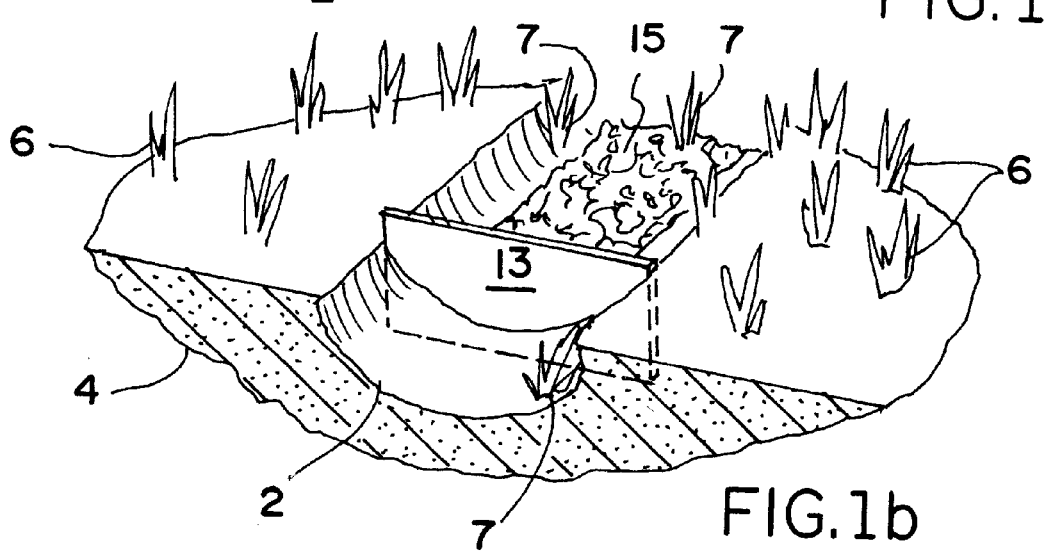
FIG. 1b is a sectioned perspective view showing a propeller scar with a baffle n therein.

Referring to FIG. 1*a* it can be seen that when tube 11 is placed in propeller scar 2 the flow of water through propeller scar is restricted. Because water no longer freely flows through propeller scar 2 runners 7 from native grass 6 can root in propeller scar 2. It should be noted that in this embodiment tube 11 does not incorporate plant shoots. Referring to FIG. 1*b* a variation of the second embodiment of this invention is disclosed in this structure a baffle 13 is placed across propeller scar 2 in such a manner that the water flow is interrupted thereby allowing sediment 15 to build up in propeller scar 2. With this build up of sediment shoots 7 from native aquatic plants 6 can root in propeller scar 2 which incorporates sediment build up 15.

Baffles 13 can be formed from any convenient material such as plastics, metals fibers or wood. In the case of plastic baffles the polymer utilized can be biodegradable and can be designed to disintegrate in a set period of time i.e. 12 months.

In the case of metals baffle 13 can be designed to corrode away in a set period of time i.e. a ferrous metal baffle which will rust away in 12 months.

Figure 1C:
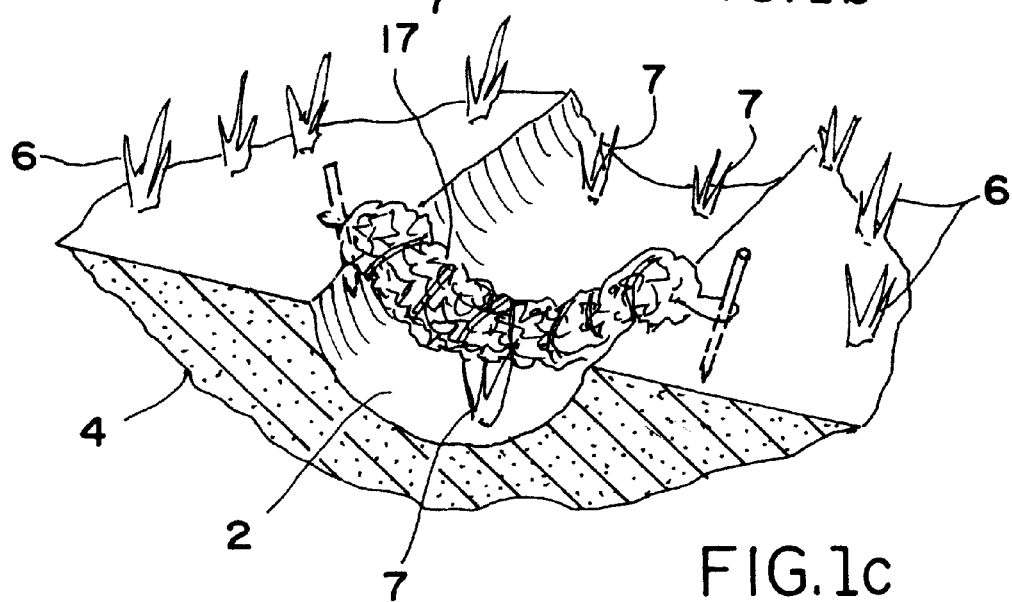
FIG. 1c is a perspective view showing a segmented sediment tube for use in this invention.

Further it is understood that baffle 13 can assume any convenient shape an can incorporate legs to facilitate its placement in propeller scar 12. The means whereby the water flow through the propeller scar may be impeded can assume other forms. For example as is shown in FIG. 1*c* the water flow through propeller scar 2 can be impeded by the placement and staking of a bundle of tied plants 17 in propeller scar 2. Bundle 17 is weighted in order to prevent movement by the current of water moving through propeller scar 2.

Further as is shown in FIG. 12. the water flow through propeller scar 2 may be impeded by putting a dam like structure in propeller scar 2. Dam like structure may be brick 19 which is further illustrated in FIG. 12. Brick 19 has an arcuate bottom 21 which roughly corresponds to the arcuate shape of propeller scar 2.

Brick 19 may be formed from clay which is fired in such a manner that it will disintegrate over a predetermined period of time in an aqueous environment. That is because brick 19 is not completely fired it tends to disintegrate when exposed to water for an extended period of time. The degree to which brick 19 is fired controls the rate of disintegration of brick 19.

A series of baffles 13 can be placed along propeller scar 2 at distances of from 1 to 6 feet apart.

As can be seen in FIG. 11 tube 11 can incorporate means whereby a plurality of tubes may be joined together.

In the illustrated instance the joining means are loops 63 on the terminal ends of tube 11. Via these loops a series of tubes 11 may be joined together i.e. by tying the loops together or by placing a pin through overlapping loops.

Referring to FIGS. 6–10 a method for filing tubes 10 and 11 with sand can be seen. In the embodiment an elongated tubular support 44 having a slot 46 cut therein is created, tubular support 44 is usually 10 or 20 ft. long. An elongated section of cloth 46 is then tucked into tubular support 44 with the ends protruding from the ends of tubular support 44 and the transverse edges 48 and 50, of cloth segment 46, protrude from slot 46. As is shown in FIG. 8 tube 44 is then filled with sand 52. Transverse edges 48 and 50 are then secured together by sewing, stapling or with an adhesive. For purposes of illustration stitching 54 is shown. End 46 and the opposite end not shown, are then tied off and the sediment tube 10 or 11 is removed from tubular support 44. As an alternate embodiment the finished sediment tube 10 or 11 can be transporting to the job site in tube 44.

FIG. 13 discloses an alternate method whereby sediment 10 may be positioned over a propeller scar (not shown). In this embodiment of this invention as sediment tube 10 reaches the water edge a workman 50 places a series of flotation devices around (rings shown) sediment tube 10. Flotation rings 55 are of such a buoyancy that they can float sediment tube 10 which can weigh many hundreds of pounds. When sediment tube 10 is free floating it can then be readily maneuvered to a desired location, whereupon flotation rings 53 are removed one at a time in order to allow sediment tube 10 to settle into the propeller scar.

Figure 14:
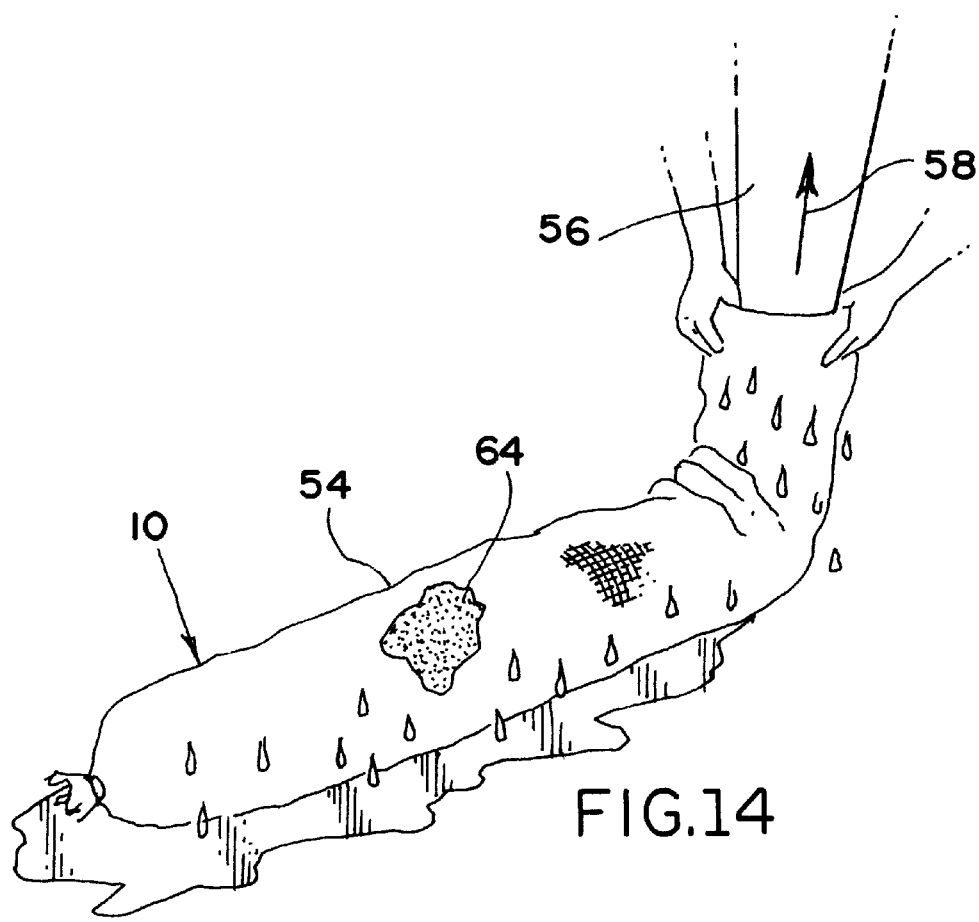
FIG. 14 is a perspective view showing a method for forming a sediment tube for use in accordance with this invention.

FIG. 14 shows an alternate method for forming a sediment tube 10. In this method a preferred tube 54 is positioned over a section 56 through which is pumped a slurry of sand and water. Sediment tube 10 has walls which are porous, whereby the water component of the slurry passes through the tube walls. As pipe section 56 is slowly withdrawn in the direction of arrow 58 preformed tube section 54 is gradually filled with sand 64 in such a manner as to form a completed sediment tube.

Figure 15:
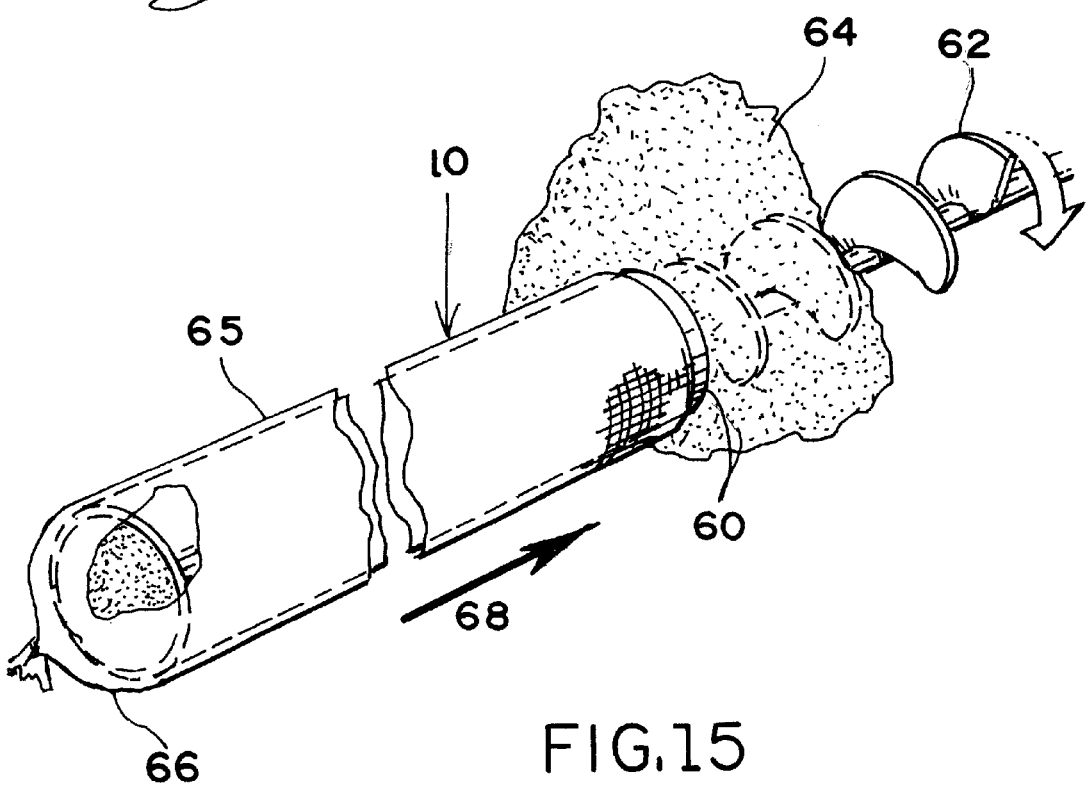
FIG. 15 is a perspective view showing still another method for forming a sediment tube for use with this invention.

FIG. 15 illustrates still another method for forming a sediment tube 10. Here a preformed tube 65 is positioned over a pipe section 60 which incorporates an internal auger 62. As auger 62 is rotated sand 64 is propelled to the head 66 of tube section 65. As pipe section 60 is withdrawn in the direction of arrow 68 preformed tube section 65 is filled with sand 64 thereby forming a completed sediment tube which can be used with or without plant shoots in accordance with the above description.

The material from which tubes 10 and 11 are formed may be in brightly colored in order to facilitate present and future placement and location of the planting sock. These observations are useful in determining the effectiveness of the overall restoration.

Tubes 10 and 11 for use in accordance with this invention for most applications should be 6 to 12 inches in diameter. Smaller diameter tubes are usually used for the propeller scars from pleasure craft whereas the larger diameter tubes are useful in conjunction with propeller scars from commercial craft. Tubes 10 and 11 are usually 3 to 20 ft. long and the length of the sediment tube is at least ten times the diameter of the tube. A more preferred range is that the length is 10 to 30 times the diameter of the sediment tube.

As is discussed above sediment tubes 10 and 11 are filled with a medium which is conducive to plant growth. While it is preferred that sediment tubes 10 and 11 be filled with sand these tubes can be filled with other media such as cement, slag, gravel, stones, rocks, clay etc.

While the above description relates primarily to propeller scars it is understood by one skilled in the art that scars in an estuary bottom can be created by other than the contact of a propeller with the estuary bottom. For example a scar can be created by the keel or rudder of a boat coming into contact with the estuary bottom or by something being dragged across the estuary bottom.

Further the above description relates to the use of various types of apparatus for the placement of the sediment tube in the scar. It is understood that the sediment tubes and the other disclosed devices can be manually placed in the scar without the need for specialized apparatus.

The above description and drawings are illustrative of modifications that can be made without departing from the present invention, the scope of which is to be limited only by the following claims.

What is claimed is:

1. A process for planting aquatic plants in a propeller scar which comprises placing an elongated sediment tube in the propeller scar, wherein said sediment tube is formed from a biodegradable material, incorporates a growing medium and has a plurality of sea grass shoots protruding therefrom.

2. The process of claim 1 wherein the sediment tube is filled with a medium which is conducive of aquatic plant growth and wherein the sediment tube disintegrates as a result of the aquatic environment.

3. The process of claim 1 wherein the sediment tube is filled with a mixture of sand and fertilizer.

4. A process for planting aquatic plants underwater into a propeller scar which comprises the steps of;
   a. forming a sediment tube which is formed from a biodegradable material and has a plurality of sea grass shoots protruding therefrom,
   b. positioning said sediment tube in a suitable apparatus for causing said sediment tube to be placed in the propeller scar, wherein said sediment tube is adapted to disintegrate in a predetermined period of time.

5. The process of claim 4 wherein the sediment tube is filled with a medium which is conducive to aquatic plant growth and wherein the planting sock disintegrates as a result of the aquatic environment.

6. The process of claim 4 wherein the sediment tube is filled with a mixture of sand and fertilizer.

7. The process of claim 2 wherein the terminal ends of the sediment tube incorporate means wherein a plurality of tubes can be attached to each other.

8. A process for encouraging the growth of aquatic plants in a propeller scar which comprises placing an obstruction, which is formed from a biodegradable material, in the propeller scar, wherein said obstruction impedes the flow of water through the propeller scar thereby allow native aquatic plants to root in the propeller scar.

9. The process of claim 8 wherein the obstruction is a baffle which is positioned transverse to the propeller scar and the baffle disintegrates as a result of the aquatic environment.

10. The process of claim 8 wherein the obstruction is a brick which placed transverse across the propeller scar.

11. The process of claim 10 wherein the brick is adapted to disintegrate over a predetermined period of time.

12. A process for encouraging the growth of aquatic plants underwater in a propeller scar which comprises the steps of:
   a. forming a sediment tube, which is formed from a biodegradable material and filling said sediment tube with a growing medium,
   b. positioning said sediment tube in a propeller scar, wherein said sediment tube is adapted to impede the flow of water in the propeller scar and is adapted to disintegrate in a predetermined period of time.

13. The process of claim 12 wherein the sediment tube is filled with a medium which is conducive to aquatic plant growth and wherein the tube disintegrates as a result of the aquatic environment.

14. The process of claim 12 wherein the tube is filled with a mixture of sand and fertilizer.

15. A tube which is useful in the restoration of sea grass, in a propeller scar, comprising an elongated structure which is formed from a biodegradable flexible material which is filled with sand wherein the length of the tube is at least 10 times the diameter of the tube.

16. The tube of claim 15 wherein the tube further incorporates a plurality of sea grass shoots.

17. The tube of claim 15 wherein the length of the tube is between 10 and 30 times the diameter of the tube.

18. The planting tube of claim 17 wherein the tube further incorporates a plurality of sea grass shoots.

* * * * *